Figure 1:
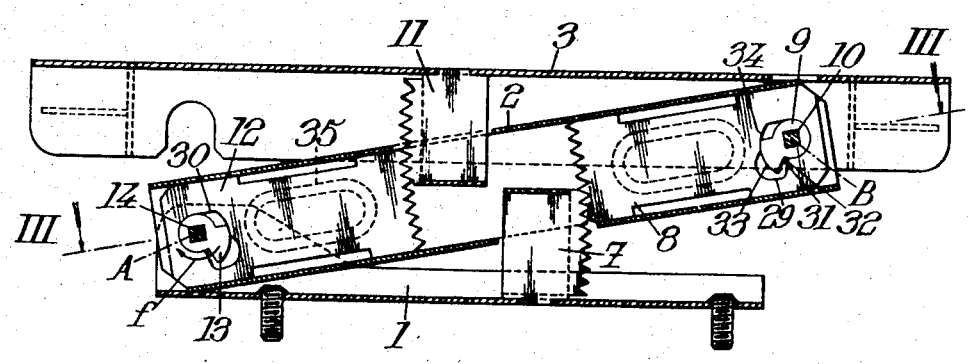

United States Patent [19]
Christin

[11] 3,853,295
[45] Dec. 10, 1974

[54] VERTICALLY ADJUSTABLE SUPPORTS FOR VEHICLE SEATS

[75] Inventor: Georges Etienne Christin, Marnes-la-Coquette, France

[73] Assignee: Etablissements Bertrand Faure, Putreaux, France

[22] Filed: Oct. 3, 1972

[21] Appl. No.: 294,559

[30] Foreign Application Priority Data
Oct. 6, 1971 France .............................. 71.36038

[52] U.S. Cl. ............................................... 248/396
[51] Int. Cl. ........................................... F16m 13/00
[58] Field of Search ........... 248/393, 394, 396, 397, 248/429; 108/1, 4, 6, 9

[56] References Cited
UNITED STATES PATENTS
| 398,639 | 2/1889 | Melchoir | 248/397 |
| 3,552,707 | 1/1971 | Tanaka | 248/396 X |
| 3,692,271 | 9/1972 | Homier et al. | 248/396 X |

FOREIGN PATENTS OR APPLICATIONS
| 528,081 | 8/1940 | Great Britain | 248/394 |

Primary Examiner—Roy D. Frazier
Assistant Examiner—Robert W. Gibson, Jr.
Attorney, Agent, or Firm—Larson, Taylor and Hinds

[57] ABSTRACT

The support comprises a first rigid lower frame fast to the floor of the vehicle, a second rigid frame mounted in pivoting fashion around a horizontal rear axis linked to the first frame and extending along the width of the seat and a third rigid frame mounted in pivoting fashion around a second horizontal axis parallel to the first and linked to the front end of the second frame. The first locking means is easily operated by the seated person to block or unblock the second frame in one or other of a plurality of its different angular positions of pivoting with respect to the first frame around the first axis. The second locking means is easily operable by the seated person to block or unblock the third frame in one or other of a plurality of its different angular positions of pivoting with respect to the second frame around the second axis. The first and second locking means are arranged so as to be controllable alternately by a single hand lever easily accessible to the seated person, mounted in pivoting fashion around a third horizontal axis parallel to the first two axes.

5 Claims, 3 Drawing Figures

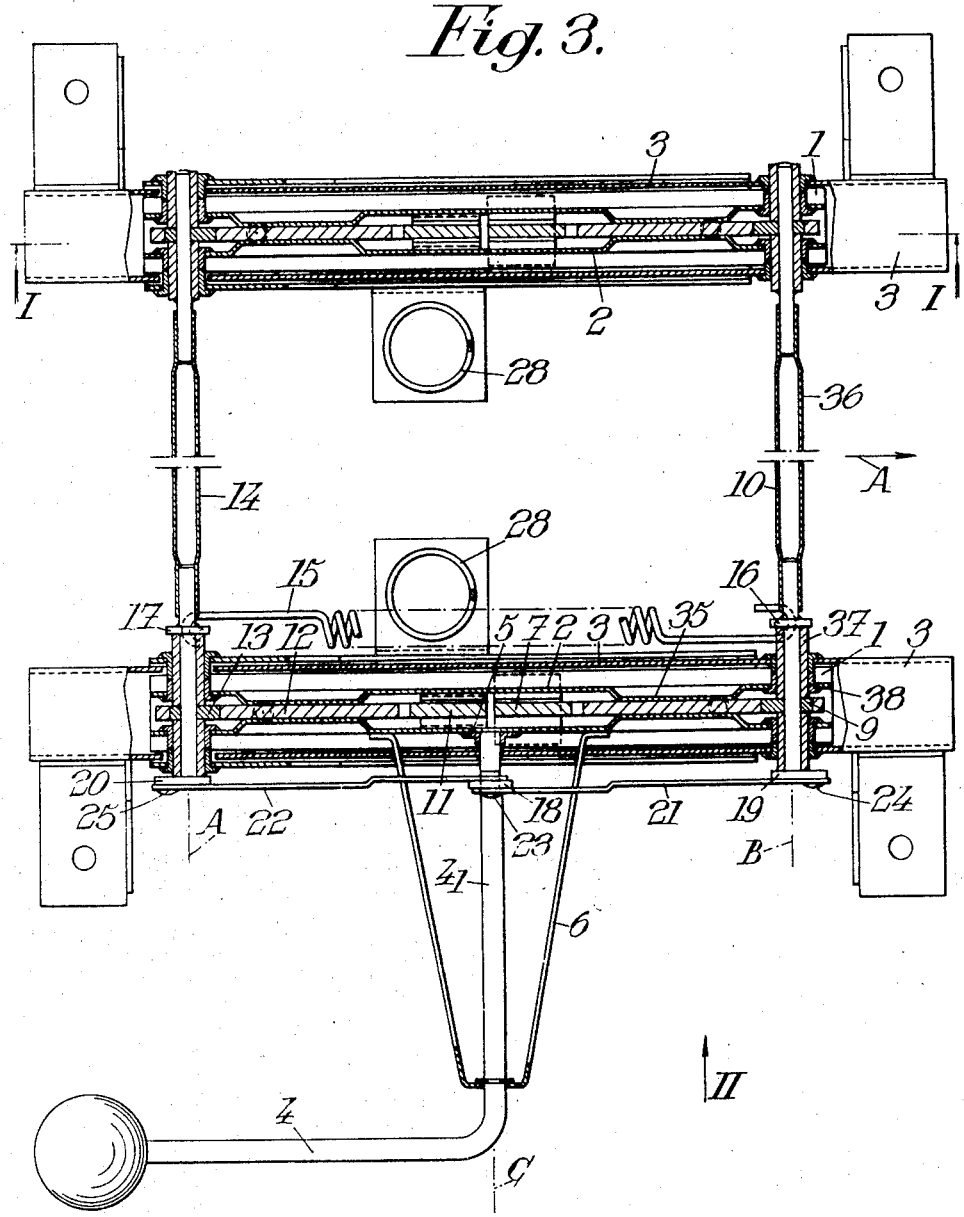

VERTICALLY ADJUSTABLE SUPPORTS FOR VEHICLE SEATS

The invention relates to vehicle seat supports adjustable vertically in inclination and in height.

It relates more particularly, amongst these supports, to those comprising a first lower rigid frame fast to the floor of the vehicle, a second rigid frame mounted in pivoting manner around a rear horizontal axis linked to the first frame and extending along the width of the seat, a third rigid frame mounted in pivoting manner around a second horizontal axis parallel to the first and linked to the forward end of the second frame, first locking means, easily operable by the seated person in order to control at will the blocking and the unblocking of the second frame in one or other of a plurality of its different angular positions of pivoting with respect to the first frame around the first axis, and second locking means easily operable by the seated person in order to control at will the blocking and the unblocking of the third frame in one or other of a plurality of its different angular positions of pivoting with respect to the second frame around the second axis.

It is a particular object of the invention to render supports of the type concerned such that they respond better to the diverse requirements of practice than hitherto, especially to simplify their control.

The said supports according to the invention are essentially characterised in that their first and second locking means are arranged in such a manner as to be controllable alternately by one and the same member easily accessible by the seated person.

In the preferred embodiments, one and/or the other of the following features may also be used:

- the single control element of the first and second locking means is a hand lever mounted in pivoting manner around a third horizontal axis parallel to the two first axes,
- the first locking means comprise two toothed sectors centered on the first axis and adapted to coact between themselves on locking, of which sectors one is fast to the first frame and of which the other is mounted in radially sliding manner upon the second frame under the control of a rotating cam fast to a shaft centred on the second axis, the second locking means comprise also two toothed sectors centred on the second axis and adapted to coact between themselves on locking, of which sectors one is fast to the third frame and the other is mounted in radially sliding manner on the second frame under the control of a rotating cam fast to a shaft centred on the first axis and the two cams are elastically urged permanently towards their angular position corresponding to locking,
- in a support according to the two preceding paragraphs, the shaft of the control element is connected to each cam shaft by two cranks respectively fast to these two shafts and through a connecting rod articulated on these two cranks,
- in a support according to the preceding paragraph, the articulated mounting of each connecting rod on one of the two cranks to which it is linked, is ensured in such a way that, from its middle inactive position, the angular movements of the crank fast to the shaft of the control element are manifested by a driving of one only of the two other cranks for a given direction of these angular movements and by a driving of the other crank only for the opposite direction,
- in a support according to the preceding paragraph, the articulation of each connecting rod on the crank fast to the shaft of the control element comprises a button or stand fast to this crank and a button slot hollowed in the connecting rod and capping this stand, the said stand being preferably common to the articulations of the two connecting rods on the said crank,
- the means which elastically urge the two cams permanently towards their angular position corresponding to locking are constituted by a single helicoidal tension spring stretched between two feet fast to the shafts of these two cams respectively,
- the edge of each cam cooperates with the edge of an aperture fast to the sliding toothed sector or corresponding bolt and these edges are designed in such a manner that, on one hand, during the course of unblocking, a section of the first edge oppose a section of the second edge practically without sliding against it, these two sections being then both oriented at each moment in a substantially transversal direction, that is to say, substantially perpendicular to that of the sliding of the bolt, and that, on the other hand, at the end of the locking stroke, two circular areas of the edges concerned, oriented in a transverse direction, slide along one another parallel to this transverse direction, these two flat areas being preferably slightly excentric with respect to one another in such a way as to exert a wedging effect.

The invention comprises, apart from these main features, certain other features which are preferably used at the same time and of which more will be said later.

In the following a preferred embodiment of the invention will be described, with reference to the accompanying drawings, given of course, in a non-limiting manner.

Figure 2:
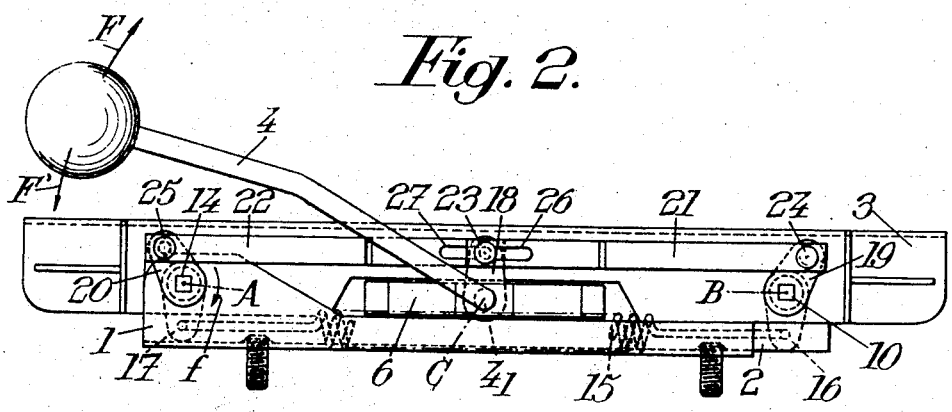

FIGS. 1 and 2 of these drawings, show respectively in vertical section along the line I—I of FIG. 3 and in lateral view along the arrow II of FIG. 3, an embodiment of a seat support constructed according to the invention.

FIG. 3 shows the same support in a horizontal section along the plane III—III of FIG. 1, assuming that the support illustrated in this FIG. 1 is folded back into its lowest position.

The support concerned comprises:
- a first lower rigid frame 1 fast to the floor of the vehicle, possibly through a slide which regulates the forward or backward position of the seat,
- a second rigid frame 2 which, for all positions of the support other than its lowest folded-back position, is generally inclined upwards and towards the front of the seat, which frame is mounted in pivoting manner around a rear horizontal axis A linked to the first frame and extending along the width of the seat,
- a third rigid frame 3 mounted in pivoting manner around a horizontal axis B parallel to the axis A and linked to the end front of the frame 2,
- first means easily operable by the seated person to render the frames 1 and 2 angularly fast to one another, in one or other of a plurality of distinct relative angular positions around the axis A,
- and second means easily operable by the seated person to render the two frames 2 and 3 angularly fast to one another in one or other of a plurality of distinct relative angular positions around the axis B.

In the known embodiments of such supports, the first and second locking means described above were generally controlled by means of various elements placed respectively at the front and at the rear of the seat so that the adjustment of the level and inclination of the latter, requiring successive operations of these two elements relatively distant from one another, was relatively long and awkward.

Furthermore the multiplicity of control elements resulting from the addition of these two elements to those generally provided also to adjust the forward position of the seat and the inclination of its back rest tended to confuse the user.

In the case of the present invention, these drawbacks are remedied by providing once and for all, one and the same hand lever to control the first and second locking means described above.

In other words, it suffices to activate the said single hand lever in order to assure the adjustment of the seat in height and in inclination.

In the embodiment described and illustrated herein, this hand lever, denoted by reference numeral 4, is constituted by a rod bent at right angles of which a terminal portion $4_1$ extends along a horizontal axis C linked to the frame 2 and parallel to the axes A and B: this portion is for example mounted in pivoting manner on the said frame 2 by means of a bearing plate 5 and a yoke 6.

The first locking means comprise here:
- two toothed sectors 7 and 8 centred on the axis A, of which sectors the teeth are engaged on locking and of which one 7 is fast to the frame 1 whilst the other 8, constituting a bolt, is mounted in radially sliding manner on the frame 2,
- and a rotating cam 9 fast to a camshaft 10 centred on the axis B, which cam is adapted to control the radial sliding of the bolt 8 with respect to the axis A.

Similarly the second locking means comprise:
- two sectors toothed 11 and 12 centred on the axis B, of which the teeth are engaged on locking and of which one 11 is fast to the frame 3 whilst the other 12, constituting a bolt, is mounted in radially sliding manner on the frame 2,
- and a rotating cam 13 fast to a camshaft 14 centred on the axis A, this cam being adapted to control the radial sliding of the bolt 12 with respect to the axis B.

The two cams 9 and 13 are constantly urged towards their extreme angular position (illustrated on FIG. 1) corresponding to the locking by a single helicoidal tension spring 15 stretched between two cranks 16 and 17 fast respectively to the two shafts 10 and 14.

Between the hand lever 4 and the cams 9 and 13, or more precisely between the portion $4_1$ of this hand lever and the shafts 10 and 14 of the cams is interposed a mechanism allowing the angular movements of the hand lever respectively corresponding to the two angular areas situated on each side of its middle inactive position to be transmitted selectively to these cams.

In other words actuation of the hand lever in the clockwise direction from its inactive position, which is illustrated in FIGS. 2 and 3, manifests itself in a pivoting of one of the cams and not of the other, and on the other hand actuation of said hand lever in the anti-clockwise direction from its inactive position is manifested in a pivoting of the said other cam and not of the first.

In the present embodiment, this mechanism comprises:
- three cranks or feet 18, 19 and 20 respectively fast to the portion $4_1$, to the shaft 10 and to the shaft 14,
- and two connecting rods 21, and 22 articulated respectively, the first on an eccentric stud part 23 of the crank 18 and on an eccentric part 24 of the crank 19, and the second on the eccentric stud part 23 and on an eccentric part 25 of the crank 20.

The articulation of the connecting rods on the parts 24 and 25 allows solely pivoting, but the articulations of these connecting rods on the stud part 23 are assured by means of elongated button slots 26 and 27 formed in these connecting rods and the said stud part passing through these slots thus allowing certain sliding movements of these connecting rods with respect to this part.

At rest, the tension of the spring 15 is transmitted to the connecting rods 21 and 22 by means of the feet 16, 17 of the shafts 10, 14, of the cranks 19, 20 and of the parts 24, 25 in such a way that the part 23 is straddled by the ends, of the button slots 26 and 27, situated on each side of the end of the corresponding connecting rod and forms an anchoring spot for these two connecting rods (FIG. 2).

For this inactive position, the cams (of which more will be said later) are blocked in their locking position corresponding to the position of maximum mutual separation of the two connecting rods: the cranks 19 and 20 then are each in one of their angular end-of-stroke positions.

If, from this inactive position, the hand lever 4 is actuated in one direction, one of the two connecting rods 21 and 22 is pulled horizontally by the part 23 and the other remains immobile, not being pushable beyond its end-of-stroke position.

Thus, if the hand lever 4 is actuated in the direction of the arrow F (FIG. 2) from its end-of-stroke position:

- the part 23 draws the connecting rod 22 towards the right, which makes the shaft 14 pivot in the direction of the arrow $f$ (FIGS. 1 and 2) and disengages the bolt 12 towards the left,
- but the said part 23 does not displace the connecting rod 21, sliding simply inside the button slot 26 formed in this connecting rod, the bolt 8 thus remaining engaged with the complementary teeth of the sector 7.

If next the hand lever 4 is released, the tension of the spring 15 restores the connecting rod 22 back into its initial position and the hand lever 4 into its own.

Similarly manipulation of the hand lever 4 in the opposite direction to the preceding one (arrow F', FIG. 2) from its inactive position releases the bolt 8 towards the right whilst maintaining the bolt 12 blocked.

When one of the bolts is unblocked, the seat user can adjust at will the angular position of the seat around the corresponding axis A or B: to effect these adjustments around the rear axis A, he can do this by tilting the seat, supporting himself with his feet, on one hand, on the floor of the vehicle and on the other hand, with his back upon the back rest of the seat; the adjustments around the forward axis B will advantageously be carried out by the presence of compensating springs 28 (FIG. 3), preferably of the helicoidal compression type, inserted vertically between the frames 2 and 3 or preferably between the frames 1 and 3.

The cams 9 and 13 each coact with the inner edge, constituting a countercam, of an aperture (respectively 29, 30) formed in the corresponding bolt (8, 12).

Each cam comprises in particular a rectilinear portion 31 passing through the axis (A or B) of the cam and adapted to coact during the course of unlocking, with a portion 32, of the edge of the corresponding aperture, oriented substantially along a transverse direction, that is to say, perpendicular to the direction of sliding of the bolt, these two portions arranged to mutually oppose each other such that at the end of the unlocking stroke there is substantially no sliding against one another, in the direction of sliding of the bolt.

Furthermore each cam comprises a circular band 33 adapted to coact at the end of locking with a circular band 34 of the corresponding edge of the aperture by sliding against the latter in a direction substantially perpendicular to that of the sliding of the corresponding bolt. The two circular bands 33 and 34 are preferably slightly eccentric in such a way that their relative sliding exerts a wedging effect conducive to safe locking.

It is to be noted that in locking position, the thrusts exertable by each bolt on the corresponding cam is manifested simply by radial application of this cam on its axis, and in no way by urging this cam to pivot, so that the locking is perfectly secure.

Examining the accompanying Figures which illustrate the above-described embodiment, the following is to be noted:

- each of the frames 1, 2, and 3 is constituted essentially by two small beams parallel linked to each other by shafts 10 and 14; the two small beams of the frame 1 are directly bolted to the floor of the vehicle, which is preferably in this case a heavy vehicle; the two small beams of the frame 2 are constituted each by two parallel flat surfaces having stamped recessed flats 35 which bound the guide passages for the sliding bolts; as for the two small beams of the frame 3, they are cross-braced by the chassis of the seat (not shown) which is attached to them;

- each of the two shafts 10 and 14 have portions of square cross-section which pass through complementary holes of the cams 9, 13, of the feet 16, 17 and of the cranks 19, 20; these portions are linked to each other axially by hollow tubes 36 which are clamped on them and they are themselves surrounded by sleeves 37 having cylindrical outer surfaces of rotation in order to allow them to pivot in appropriate bearings 38;

- in FIG. 3 the arrow A denotes the direction of the front of the seat.

Consequently and whatever the embodiment adopted, a seat support is provided whose constitution and operation emerge sufficiently from the foregoing.

This support has numerous advantages over those which have been previously available, especially:

- the possibility of controlling the adjustment of the height and inclination of the seat with the aid of one and the same hand lever operable at will by the seated person in two pivoting directions from an initial middle inactive position towards which it is constantly urged,

- the robustness of the construction, in view of the totality of the forces exerted on the seat being transmitted to the floor of the vehicle by means of toothed sectors and of the single central part of the intermediate frame 2, which part can be reinforced locally for this purpose, even if only by the absence of any stamped flattened ends at this spot,

- and nonetheless good resistance of this support to tilting movements, due to the good triangularisation of the assembly, that is to say, to the high value of the distances between each of the axes A and B and the positioning of the locking of the toothed zones centred respectively on these axes.

As goes without saying, and as furthermore results already from the foregoing, the invention is not limited in any way to those of its embodiments and methods of realisation which have been more especially envisaged; it encompasses, on the contrary, all modifications.

I claim:

1. Vehicle seat support, comprising a first rigid lower frame fastenable to the floor of the vehicle, a second rigid frame mounted at one end thereof in pivoting fashion around a horizontal first axis linked to the first frame and extending along the width of the seat, a third rigid frame mounted in pivoting fashion around a second horizontal axis parallel to the first axis and linked to the other end of the second frame, first locking means easily operated by a person occupying the seat to block or unblock the second frame in one or another of a plurality of its different angular positions of pivoting with respect to the first frame around the first axis, second locking means easily operable by said person to block or unblock the third frame in one or another of a plurality of its different angular positions of pivoting with respect to the second frame around the second axis, a control means easily accessible to the seated person, said first and second locking means being arranged so as to be controllable alternately by said control means, the first locking means comprising two toothed sectors centered on the first axis and adapted to coact between themselves on locking, of which one sector is fast to the first frame and of which the other is mounted in radially sliding manner upon the second frame under the control of a rotating cam fast to a camshaft centered on the second axis, the second locking means also comprising two toothed sectors centered on the second axis and adapted to coact between themselves on locking, of which one sector is fast to the third frame and of which the other is mounted in radially sliding fashion upon the second frame under the control of a rotating cam fast to a camshaft centered upon the first axis and the two cams being permanently elastically urged towards their angular position corresponding to locking.

2. Seat support according to claim 1, wherein said control means comprises a single control element which includes a hand lever mounted in pivoting fashion around a third horizontal axis parallel to the first two axes.

3. Seat support according to claim 1, wherein the means which permanently elastically urge the two cams towards their angular position corresponding to locking, are constituted by a single helicoidal tension spring stretched between two cranks fast respectively to the said camshafts.

4. Seat support according to claim 1, wherein each cam has an edge which cooperates with an edge of an aperture fast to its respective sliding toothed sector and wherein each set of cooperating edges are designed in such a way that on one hand, at the end of the unlocking stroke, a section of a first of said edges of the set opposes a section of a second of said edges edge of the set substantially without sliding against it, these two sections being then both oriented in a substantially transverse direction, substantially perpendicular to the direction of sliding movement of the sliding of the toothed sector, and that, on the other hand, near the end of the locking stroke, two cylindrical surfaces of the edges concerned, substantially oriented in the said transverse direction, slide along one another substantially parallel to this transverse direction.

5. Seat support according to claim 4, wherein the two cylindrical surfaces belonging respectively to the cam and the aperture and cooperating amongst themselves at the end of the locking stroke are slightly eccentric with respect to one another in such a manner as to exert a wedging effect.

* * * * *